(12) United States Patent
Wang et al.

(10) Patent No.: US 11,784,359 B2
(45) Date of Patent: Oct. 10, 2023

(54) THERMAL RUNAWAY DETECTION METHODS AND WARNING SYSTEMS

(71) Applicant: GM Global Technology Operations LLC, Detroit, MI (US)

(72) Inventors: Yue-Yun Wang, Troy, MI (US); Jian Gao, Auburn Hills, MI (US); Jeremie Dernotte, Shelby Township, MI (US); Scott E. Parrish, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/392,609

(22) Filed: Aug. 3, 2021

(65) Prior Publication Data
US 2023/0040212 A1    Feb. 9, 2023

(51) Int. Cl.
*H01M 10/48* (2006.01)
*H01M 10/42* (2006.01)
*B60L 58/26* (2019.01)

(52) U.S. Cl.
CPC .......... *H01M 10/482* (2013.01); *B60L 58/26* (2019.02); *H01M 10/425* (2013.01); *H01M 10/486* (2013.01); *H01M 2010/4278* (2013.01)

(58) Field of Classification Search
CPC ............. H01M 10/482; H01M 10/425; H01M 10/486; H01M 2010/4278; B60L 58/26
USPC .......................................................... 320/134
See application file for complete search history.

(56) References Cited

U.S. PATENT DOCUMENTS

| | | | |
|---|---|---|---|
| 9,840,161 B2 * | 12/2017 | Chikkannanavar ... | H02J 7/0063 |
| 10,291,046 B2 * | 5/2019 | Ravi ..................... | H02J 7/0069 |
| 10,615,464 B2 * | 4/2020 | Hinterberger .......... | B60L 3/0046 |
| 11,541,778 B2 * | 1/2023 | Ferguson ........... | H01M 10/48 |
| 2008/0315839 A1 * | 12/2008 | Hermann ................ | B60L 58/27 |
| | | | 320/136 |
| 2013/0260192 A1 * | 10/2013 | LePort ................... | H01M 10/42 |
| | | | 429/62 |
| 2014/0368209 A1 * | 12/2014 | Henrici .................. | G01K 15/00 |
| | | | 374/163 |
| 2022/0085428 A1 * | 3/2022 | Engle ................... | H01M 50/581 |
| 2022/0289030 A1 * | 9/2022 | Pressman ............. | G01R 31/396 |

FOREIGN PATENT DOCUMENTS

| CN | 106066457 A | * | 11/2016 | .......... G01R 31/382 |
| CN | 205680751 U | * | 11/2016 | ........... H01M 10/48 |
| CN | 111313108 A | * | 6/2020 | .......... H02J 7/0029 |
| DE | 102012210258 A1 | * | 5/2013 | ............. G01K 13/00 |
| DE | 102021102049 A1 | * | 8/2022 | ......... H01M 50/581 |

* cited by examiner

*Primary Examiner* — M Baye Diao
(74) *Attorney, Agent, or Firm* — Vivacqua Crane PLLC

(57) ABSTRACT

A method for detecting thermal runaway of a cell includes: positioning a battery pack having multiple cells in an automobile vehicle; measuring a cell voltage of the multiple cells at a predetermined sample rate; and identifying if the cell voltage decreases and modulates coincident with a cell surface temperature increase indicating initiation of a cell short.

20 Claims, 7 Drawing Sheets

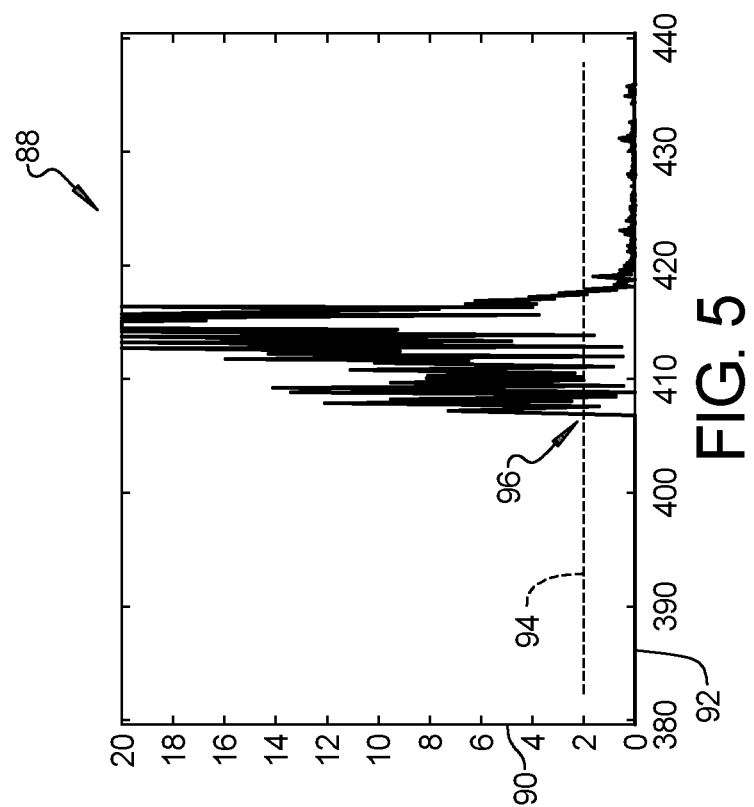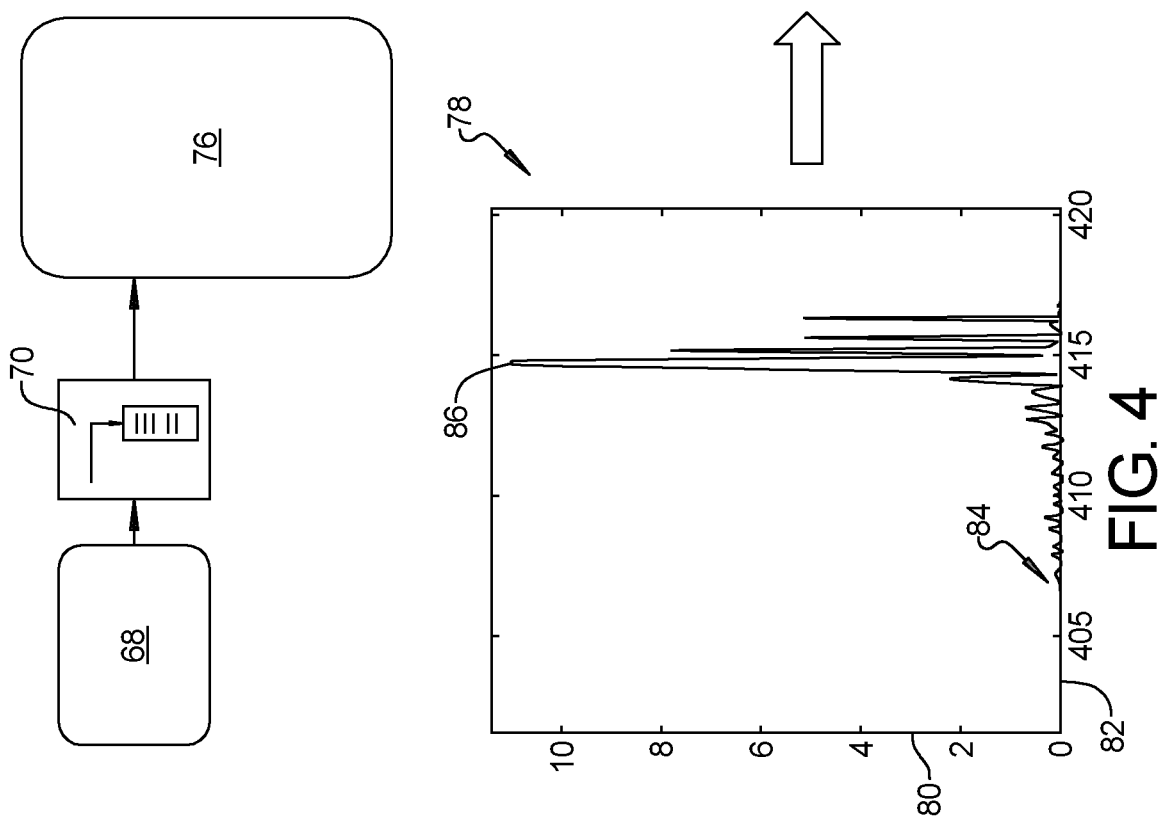

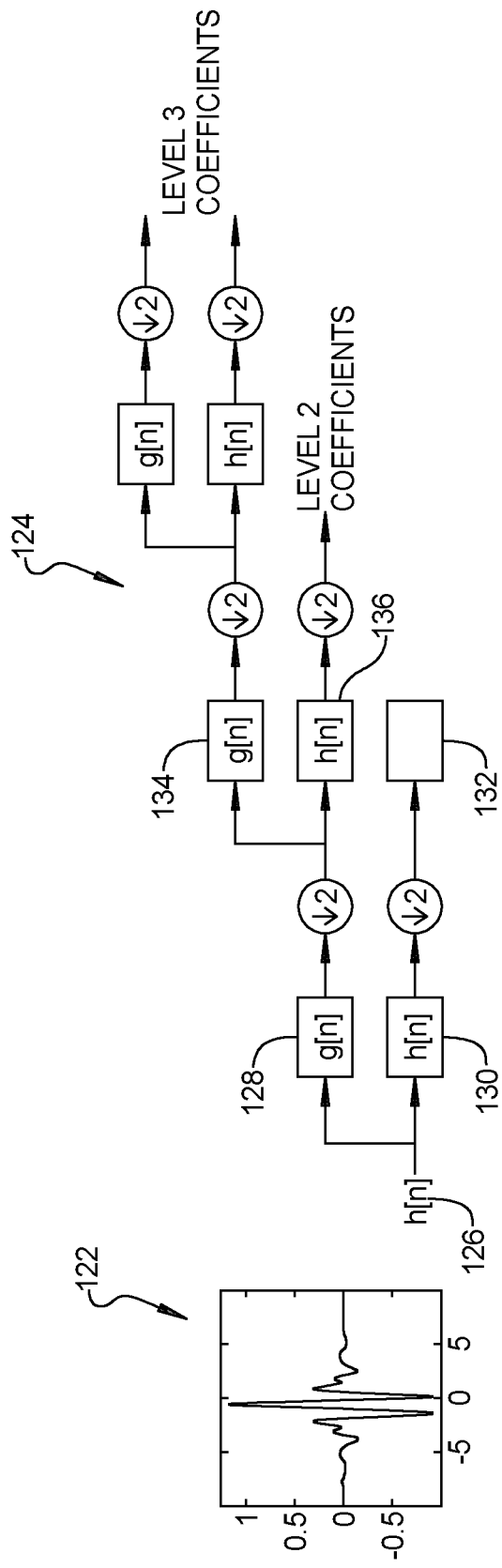

THERMAL RUNAWAY DETECTION METHODS AND WARNING SYSTEMS

INTRODUCTION

The present disclosure relates to detection and mitigation of thermal runaway of vehicle battery pack cells.

Circuit short is the most common cause of thermal runaway in a battery pack cell used in automobile vehicle systems. Short circuits often start with an initial cell short, which is followed by a progressive cell temperature rise occurring in a time period of 5-10 seconds after short initiation. A short circuit may generate a thermal runaway defining an exothermic reaction generating sufficient heat for the cell and potentially for the battery pack to ignite.

The cause of a battery cell short circuit may be from a vehicle crash, an overly fast charging operation, from highway flying debris, if the vehicle is parked at extreme environmental temperature, or from battery cell manufacturing defects. Systems to detect and identify a short circuit and to avoid thermal runaway occurring in or after the 5 to 10 second period after initiation of the short circuit are not known.

Thus, while current automobile vehicle battery pack designs achieve their intended purpose, there is a need for a new and improved system and method for detection and mitigation of short circuits and thermal runaway occurring in automobile vehicle battery pack cells.

SUMMARY

According to several aspects, a method for detecting thermal runaway of a cell includes: positioning a battery pack having multiple cells in an automobile vehicle; measuring a cell voltage of the multiple cells at a predetermined sample rate; and identifying if the cell voltage decreases and modulates indicating initiation of a cell short coincident with or preceding a cell surface temperature increase indicating a thermal runaway event.

In another aspect of the present disclosure, the method further includes confirming the automobile vehicle to be stopped prior to measuring the cell voltage.

In another aspect of the present disclosure, the method further includes: identifying if a cell temperature of approximately 70 C is reached; and identifying if a rapid cell temperature rise up to approximately 500 C occurs within approximately 5 seconds after the cell temperature reaches approximately 70 C defining initiation of the battery cell thermal runaway event.

In another aspect of the present disclosure, the method further includes determining a mean value of all cell voltages of the multiple cells by subtracting a minimum cell voltage from a sum the cell voltages.

In another aspect of the present disclosure, the method further includes: calculating a derivative of the cell voltage of individual ones of the multiple cells with respect to time; and passing the derivative of the cell voltage through a buffer.

In another aspect of the present disclosure, the method further includes calculating a fast fourier transform power spectrum applying the derivative of the cell voltage of the multiple cells with respect to time.

In another aspect of the present disclosure, the method further includes calculating a released energy applying the power spectrum.

In another aspect of the present disclosure, the method further includes: identifying if the power spectrum exceeds a predetermined spectrum threshold following initiation of the cell short; and initiating an alarm after the predetermined threshold is exceeded.

In another aspect of the present disclosure, the method further includes initiating an action following the initiation of the alarm including at least one of: stopping a charging operation of the battery pack; releasing a battery pack pressure; initiating flow of a coolant into the battery pack; communicating a warning via a smart phone to a vehicle operator; communicating a status of the battery pack to a remote cloud-based security service; and contacting an emergency service.

In another aspect of the present disclosure, the method further includes continuing to analyze the cell voltage and the cell surface temperature following the initiation of the cell short and during a time period having a cell voltage decrease and rapid cell voltage modulation and as the cell surface temperature increases.

According to several aspects, a method for detecting thermal runaway of a cell includes: positioning a battery pack having multiple cells in an automobile vehicle; measuring a cell voltage of the multiple cells at a predetermined sample rate; and identifying if a cell short is occurring in at least one of the multiple cells.

In another aspect of the present disclosure, the method further includes decomposing a signal of the cell voltage into multiple signal time domain scales through a scalable wavelet filter applying a discrete wavelet distribution (DWT).

In another aspect of the present disclosure, the method further includes: passing a cell voltage signal through the wavelet filter; and applying a scaling function to differentiate and remove frequencies of the signal predesignated as noise.

In another aspect of the present disclosure, the method further includes applying the scaling function to split a first high frequency extraction portion into a first high frequency component and a first low frequency extraction portion into a first low frequency component.

In another aspect of the present disclosure, the method further includes: halving the low frequency component from the first low frequency extraction portion; and generating level 1 coefficients.

In another aspect of the present disclosure, the method further includes: calculating a derivative of the cell voltage of individual ones of the multiple cells with respect to time; calculating a fast fourier transform power spectrum applying the derivative of the cell voltage of the multiple cells with respect to time; calculating a released energy applying the power spectrum and initiating an alarm if the power spectrum exceeds a predetermined threshold following initiation of the cell short.

In another aspect of the present disclosure, the method further includes identifying if the cell voltage decreases and modulates coincident with a cell surface temperature increase indicating initiation of the cell short.

According to several aspects, a method for detecting thermal runaway of a cell includes: confirming an automobile vehicle to be stopped; measuring a cell voltage of multiple cells of a battery pack of the automobile vehicle at a predetermined sample rate; identifying if the cell voltage begins to decrease and modulate indicating presence of a cell short; and signaling if a cell temperature of approximately 70 C is reached indicating a battery cell thermal runaway event is occurring.

In another aspect of the present disclosure, the method further includes calculating a derivative of the cell voltage of individual ones of the multiple cells with respect to time; calculating a fast fourier transform power spectrum applying the derivative of the cell voltage of the multiple cells with respect to time; calculating a released energy applying the power spectrum and initiating an alarm if the power spectrum exceeds a predetermined threshold following initiation of the cell short.

In another aspect of the present disclosure, the method further includes: passing a cell voltage signal through the wavelet filter; applying a scaling function to split a first high frequency extraction portion of the cell voltage signal into a first high frequency component and a first low frequency extraction portion into a first low frequency component; and differentiating and removing frequencies of the cell voltage signal predesignated as noise.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a graph presenting a range of derivatives of cell voltage identifying a voltage over time in seconds;

FIG. 5 is a graph presenting a calculated power spectrum versus a time in seconds;

FIG. 8 is a flow diagram providing method steps for utilizing a discrete wavelet transformation (DWT) to identify if a cell thermal runaway event is occurring;

DETAILED DESCRIPTION

The following description is merely exemplary in nature and is not intended to limit the present disclosure, application, or uses.

Figure 1:
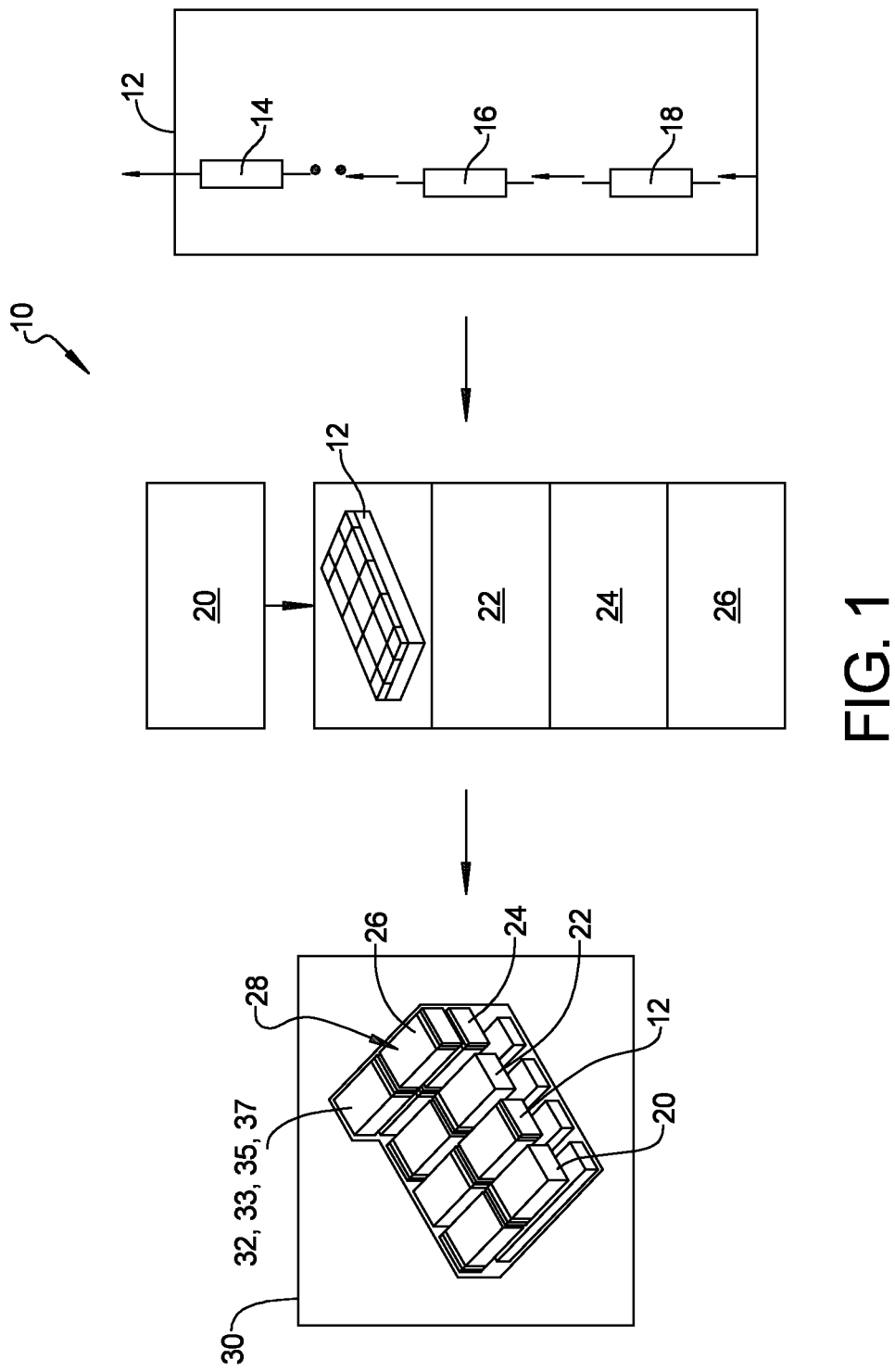
FIG. 1 is a diagram of a battery pack having multiple battery cell modules including multiple individual cells according to an exemplary aspect.

Referring to FIG. 1 a thermal runaway detection method and warning system 10 is applied to analyze the cells of one or more battery cell modules such as a first module 12 individually having multiple serially connected cells including in an exemplary aspect a first cell 14, a second cell 16 and in one exemplary aspect up to approximately a sixteenth cell 18. Multiple cell modules are then serially connected to form an exemplary module group 20 having the first module 12, a second module 22, a third module 24 and up to an Nth module 26. Multiple module groups such as the module group 20 are then serially connected to form a battery pack 28 having multiple modules and multiple cells.

The battery pack 28 is positioned in an automobile vehicle 30 which is operated using power generated by the battery pack 28. The cells of the battery pack 28 are charged when required, monitored during operation and controlled using a controller 32 which may be provided with the battery pack 28 or installed separately in the automobile vehicle 30. According to several aspects the controller 32 may include one or more computers 33 individually having one or more processors 35, at least one memory 37, and instructions stored in the memory 37. The memory 37 is a non-transitory computer readable medium.

Referring to FIG. 2 and again to FIG. 1, a graph 34 presents a cell voltage versus time and a cell surface temperature. Because the battery pack 28 consists of many cells, a fire may be generated in any one of the cells or in two or more cells and in two or more modules. Therefore, the algorithms of the present disclosure are individually applied to the battery cells. An exemplary thermal runaway process is depicted in the graph 34, which identifies a cell voltage 36 per a time period 38 in seconds and provides a cell surface temperature 39. A cell voltage 40 is generally substantially steady and a cell surface temperature 42 rises very slowly over time during normal operation of the cell until in the example shown a cell short 44 occurs at approximately 407 sec. Immediately following the cell short 44 a cell voltage 46 decreases and rapidly modulates and the cell surface temperature increases resulting in the generation and release of gas from the battery cell. A rapidly falling cell voltage 48 occurs after a time period 50 of approximately 7.9 seconds following the cell short 44, shown at an exemplary time of approximately 415 sec.

Also at the same time of approximately 415 sec a threshold cell temperature of approximately 70 C is reached after which a rapid cell temperature rise 52 occurs defining the start of a battery cell thermal runaway (TRA) event 54. During the TRA event 54 cell temperatures of 500 C or greater are reached within approximately 5 to 10 seconds after the cell temperature meets and exceeds the threshold temperature of 70 C defining the start of the TRA event 54. After the cell short 44 and within approximately 2 to 3 seconds of the rapidly falling cell voltage 48 occurring at approximately 415 sec, a cell voltage 56 of approximately zero volts is reached. The thermal runaway detection method and warning system 10 performs analyses of voltage and thermal data for the TRA event 54 at the initiation of the cell short 44 and during the time period 50 of cell voltage 46 decrease and rapid modulation and as the cell surface temperature increases as described in greater detail in reference to FIG. 3.

Figure 2:
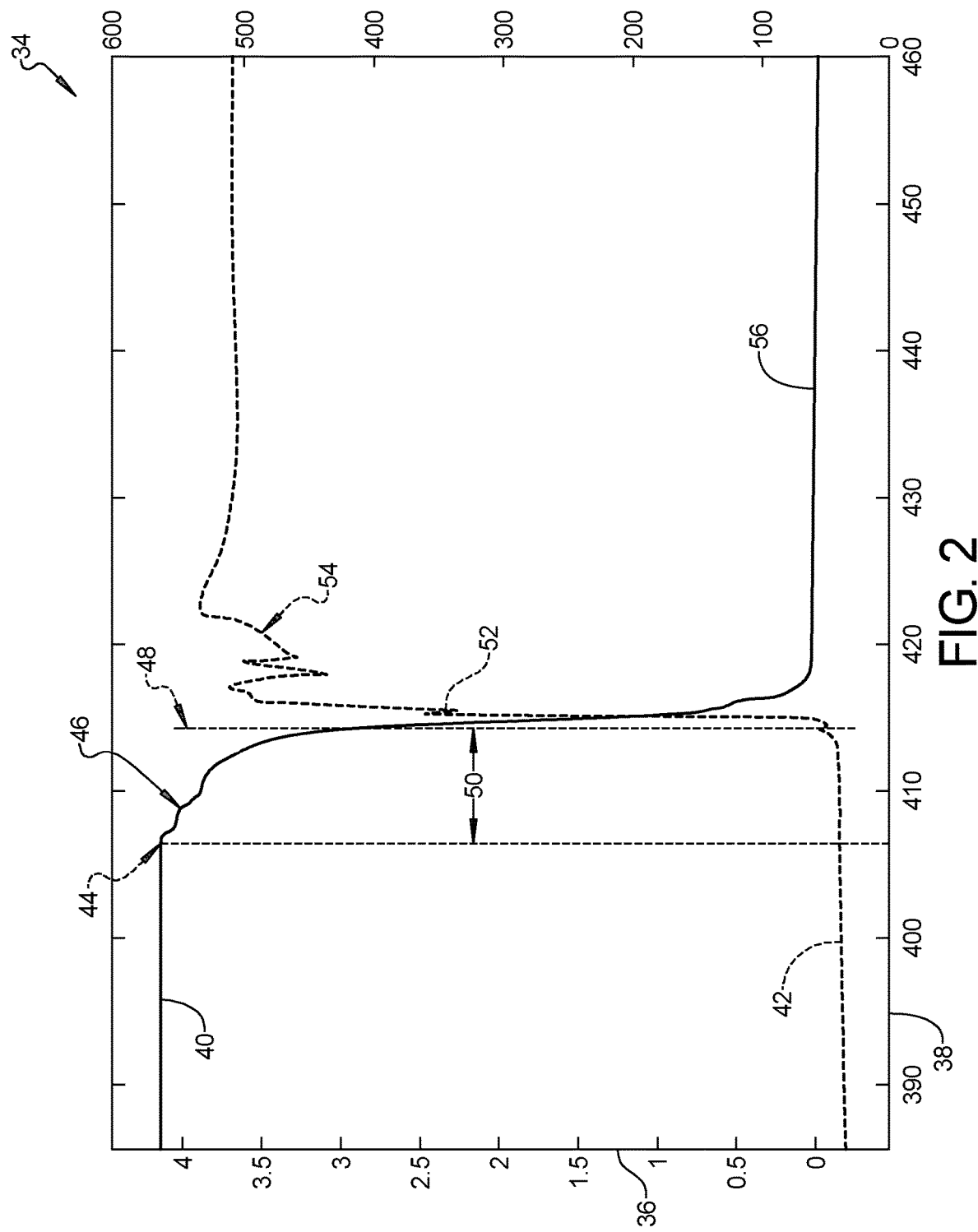
FIG. 2 is a graph presenting cell voltage versus time and a cell surface temperature.

Referring to FIG. 3 and again to FIG. 2, it is initially noted the thermal runaway detection method and warning system 10 is operable when the automobile vehicle 30 is confirmed to be stopped, including with the automobile vehicle 30 in a Park mode, and when the automobile vehicle 30 is for example at a stop light or a stop sign. During the period with no vehicle motion the cells of the battery pack 28 such as the first cell 14, the second cell 16, a third cell 60 and up to the sixteenth cell 18 of the various modules such as the first module 12 are individually queried at a predetermined time interval or sample rate. For example, each of the battery cells are queried at a sample rate of 0.05 sec. At each query for each of the cells, an open cell voltage $V_{oc}(t)$ is measured. In the example presented an open cell voltage $V_{oc1}(t)$ 62 of the first cell 14 is obtained.

After the open cell voltages are obtained for all of the cells, such as the first cell 14, the second cell 16, the third cell 60 and up to the sixteenth cell 18, in a mean determination step 64 a mean of all of the open cell voltages is calculated and a minimum of the open cell voltages is subtracted from the mean of the open cell voltages. Determining a mean open cell voltage and subtracting the minimum open cell voltage allows the effect of a measured cell voltage which is substantially different from the remaining cell voltages to be removed. To obtain the mean open cell voltage, equation 1 below is used:

$$V\text{mean}(t)=1/(n-1)\{[\Sigma 1\wedge n V oc\_i(t)]-\min(Voc\_i(t))\} \quad \text{Equation 1:}$$

Where: n=number of cells

Removing the mean of the battery cell voltages using Equation 1 above is only necessary at initial park or stop and for a removal period of approximately 2 to 3 minutes after initial park or stop. After the removal period which allows for battery rest the minimum $V_{oc}(t)$ is substantially equal to the minimum cell voltage and the mean voltage may be set substantially equal to zero.

After the mean determination step 64 is completed, or if the mean voltage is substantially equal to zero, a derivative of each voltage 66 is then determined in a derivative step 68 wherein a derivative of the measured cell voltage with respect to time is calculated using Equation 2 for every cell:

$$dV_{oci}(t)/dt \quad \text{Equation 2:}$$

A result of Equation 2 for each cell is then buffered in a buffer step 70. The buffer step 70 may apply a moving buffer window having for example a 100 point buffer 72 of cell voltages. A cell voltage sample rate may be for example t=0.05 sec. At each increment, the first point of the buffer 72 is discarded and a new point is added. The buffer 72 is a calibration applying a trade-off between detection time and robustness as the smaller the buffer size the faster a problem may be detected, while a larger buffer size provides a more accurate determination.

After each buffer is applied, a fast Fourier transform is performed in a power spectrum calculation step 74 to calculate a power spectrum using Equation 3:

$$P((i)=FFT([dV_{oc(1)}/dt, dV_{oc(2)}/dt \ldots dV_{oc(100)}/dt]) \quad \text{Equation 3:}$$

Where $P(\omega_i)$: power spectrum value at frequency $\omega_i$

Using the above calculated power spectrum value, an energy $\Delta E$ released at a sample time k is then calculated using Equation 4:

$$\Delta E(k) = \frac{1}{n} \times \sqrt{\sum_{i=1}^{n} P(\omega_i)^2}, \text{ where } n < 100 \quad \text{Equation 4}$$

$P(\omega_i) n<i<100$ are noise terms removed from the energy calculation, with i defining a predetermined frequency threshold with frequencies above the predetermined frequency threshold considered to be a noise value to be removed from the energy calculation.

Figure 3:
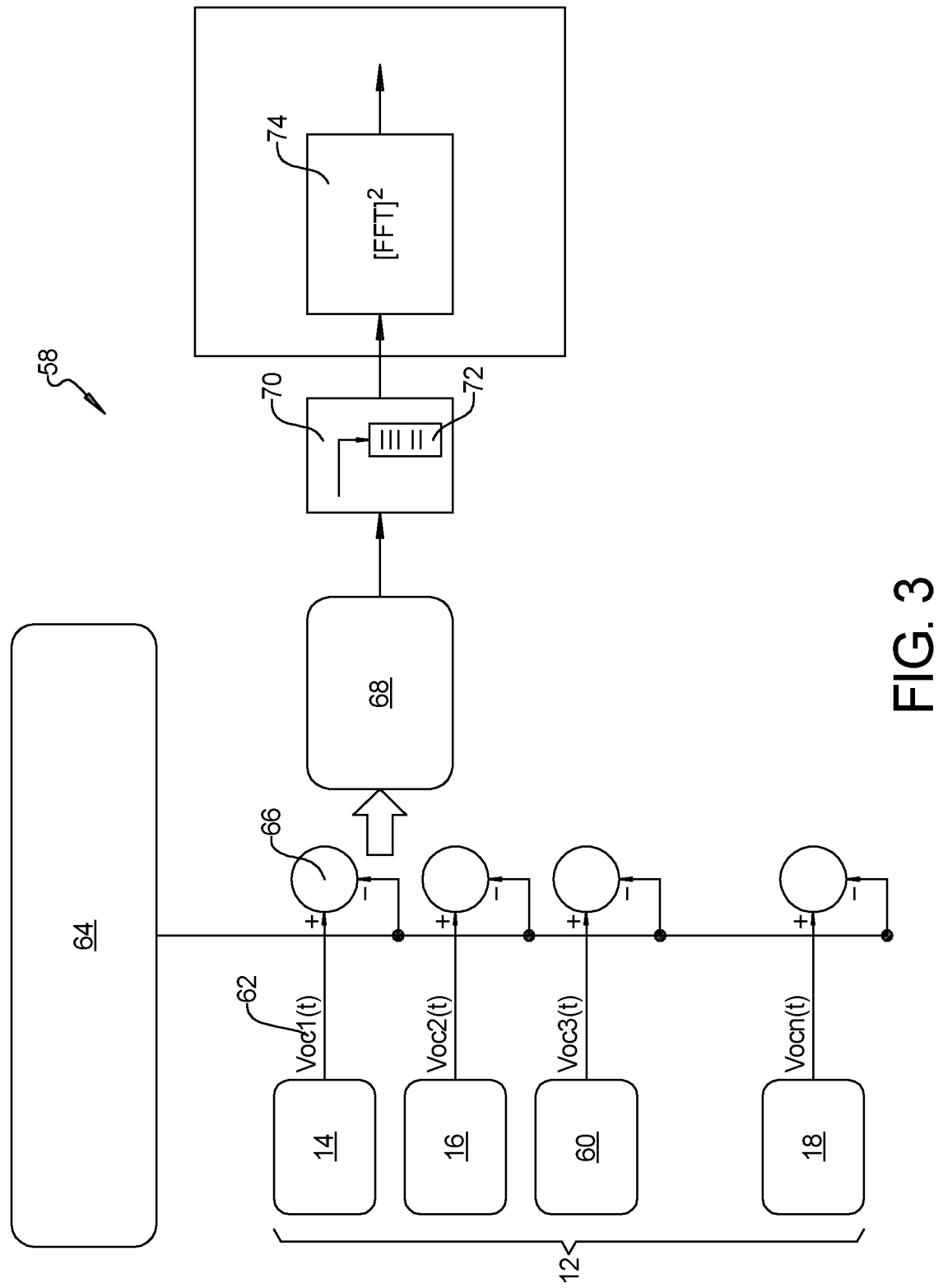
FIG. 3 is a flow diagram of method steps for identifying a cell thermal runaway event.

Referring to FIG. 4 and again to FIGS. 2 and 3, a graph 78 presents an exemplary range of derivatives of cell voltage having a voltage 80 over time 82 in seconds. A perturbation in the derivative of cell voltage 84 identifies a cell short occurring at approximately 407 sec. and a peak of the derivative 86 occurring at approximately 415 sec.

Referring to FIG. 5 and again to FIGS. 1 through 4, a graph 88 presents a calculated power spectrum 90 versus a time 92 in seconds. The power spectrum 90 may be used to set an alarm condition after detection of a thermal runaway event. For example, an alarm threshold 94 is exceeded at a power spectrum value 96 occurring approximately 0.6 sec following the initiation of the cell short occurring at 407 sec.

Referring to FIG. 6 and again to FIGS. 1 through 5, a runaway condition from an abrupt cell voltage change occurring with the automobile vehicle parked and during a charging operation is presented in a graph 98. The graph 98 presents a cell voltage 100 compared to a time 102 in seconds. A normal or good cell voltage 104 is substantially flat over time. Compared to the good cell voltage 104, a runaway cell voltage 106 is initiated by an ISC (internal short circuit) 108 detected at 2601.5 seconds followed by rapid voltage perturbations which occur ahead of a TRA 110 which occurs at 2607.9 seconds.

Figure 7:
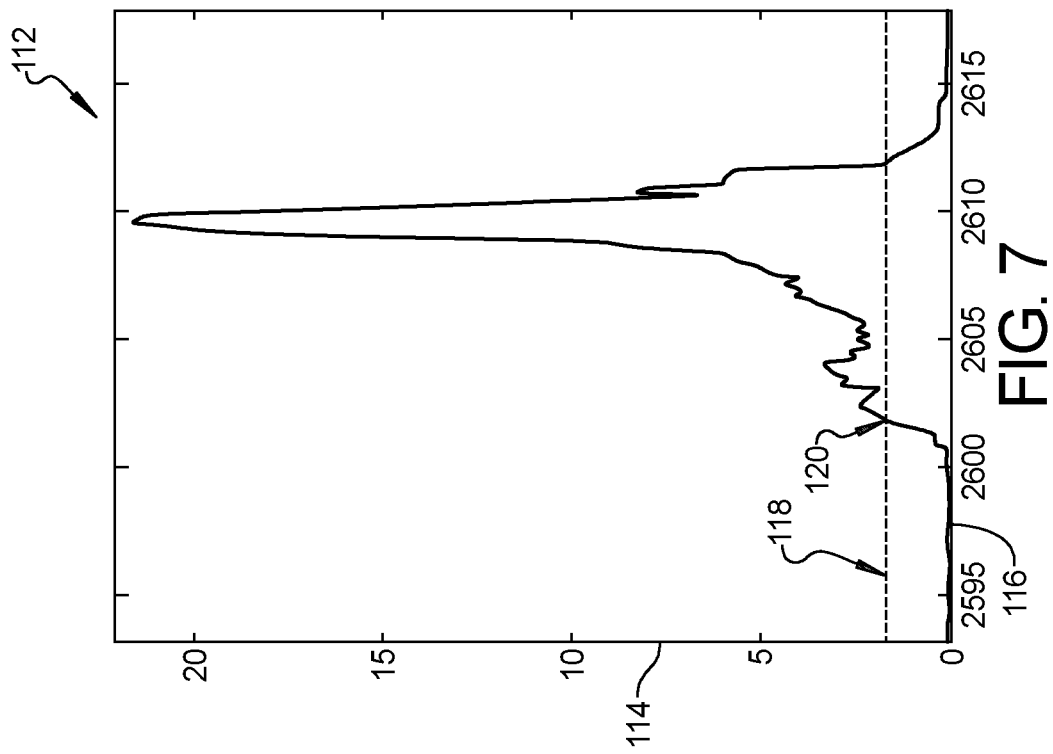
FIG. 7 is a graph presenting a power spectrum compared to a time in seconds applying a 50 ms sample rate.
Figure 6:
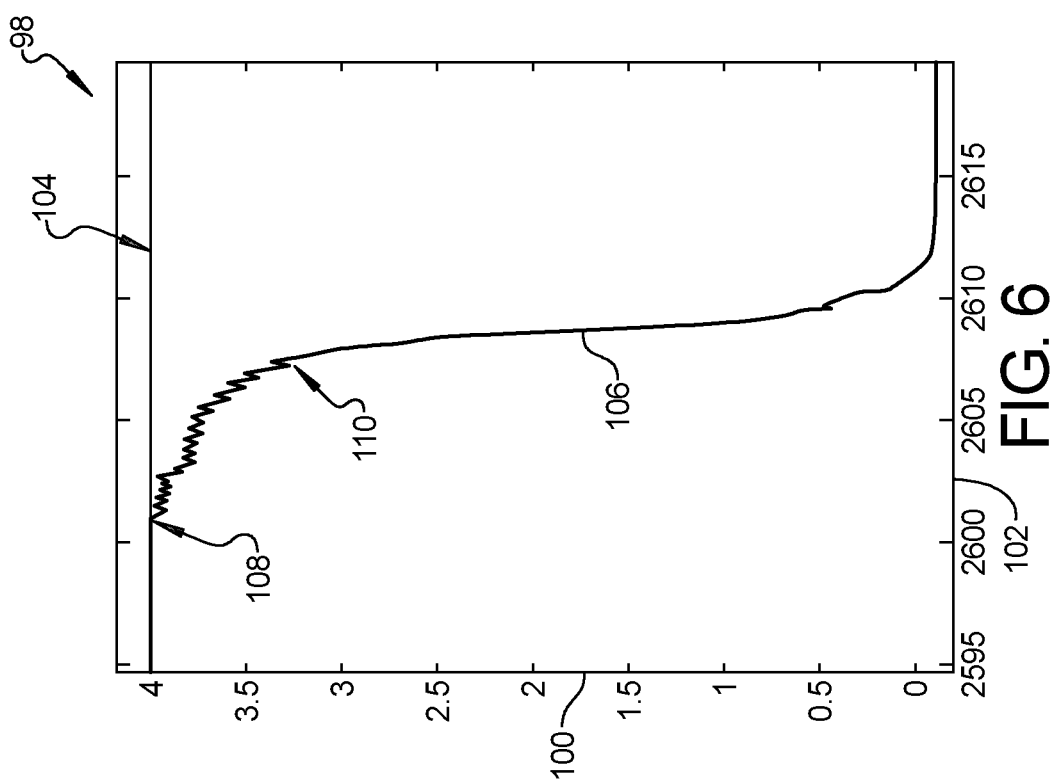
FIG. 6 is a graph presenting a cell voltage compared to a time in seconds.

Referring to FIG. 7 and again to FIGS. 1 through 6, the conditions of FIG. 6 during a charging operation are presented in a graph 112 presenting a power spectrum 114 compared to a time 116 in seconds applying a 50 ms sample rate. Similar to FIG. 5, the power spectrum 114 may be used to set an alarm condition after detection of an ISC and a thermal runaway event. For example, an alarm set threshold 118 is exceeded at a power spectrum value 120 occurring approximately 2 seconds following an ISC (internal short circuit) detected at 2601.5 seconds, with a TRA occurring at approximately 2607.9 sec.

When an alarm set threshold is exceeded, several actions may be taken or may occur. These actions may include: 1) a signal may be sent to stop the charging operation; 2) a pack pressure relief valve may open to release pack pressure; 3) a signal may be sent to start a mitigation effort which according to several aspects includes initiating a flow of chilled coolant to the pack; 4) a signal may be sent to communicate a warning via an operator's smart phone; 5) a signal may be sent to a vehicle cloud-based communication system, which may for example automatically alert an emergency service such as a 911 service; and 6) a call may be initiated to a fire-fighting service.

In lieu of using FFT to calculate a power spectrum of cell voltages, discrete wavelet transformation (DWT) of time series signals may be used. In contrast to FFT, DWT decomposes a signal into multiple signal time domain scales through a scalable wavelet filter. The wavelet filter may be scaled to separate specific signal frequencies that are pre-designated as noise. DWT provides a tool to detect abrupt signal changes which may be identified to occur during a TRA event. Multiple wavelets may be potential candidates for this application.

Referring to FIG. 8 and again to FIGS. 1 through 7, DWT may be applied as follows. A cell voltage signal is passed through a wavelet filter 122 and then acted on by a scaling function 124. In the scaling function 124, an incoming signal 126 received from the wavelet filter 122 is split and scaled in a first high frequency extraction portion 128 into a first high frequency component and in a first low frequency extraction portion 130 is scaled into a first low frequency component. The low frequency component signal from the first low frequency extraction portion 130 is halved and used to generate level 1 coefficients 132. The high frequency component generated by the first high frequency extraction portion 128 is halved and forwarded to a second high frequency extraction portion 134 where the signal is scaled down into a second high frequency component and in a second low frequency extraction portion 136 is scaled into a second low frequency component. The low frequency component signal from the second low frequency extraction portion 136 is halved and used to generate level 2 coefficients. The high frequency component generated by the second high frequency extraction portion 134 is halved and forwarded if desired to additional high and low frequency extraction portions to produce level 3 coefficients if desired. DWT is thereby used to extract high frequency noise components from the cell voltage signals.

The DWT coefficients may be calculated using Equation 5 and Equation 6 below as follows:

$$c_i(n) = \sum_{k=-\infty}^{\infty} x(k)h(2n-k) \quad \text{Equation 5}$$

$$l_i(n) = \sum_{k=-\infty}^{\infty} x(k)g(2n-k) \quad \text{Equation 6}$$

Figure 9:
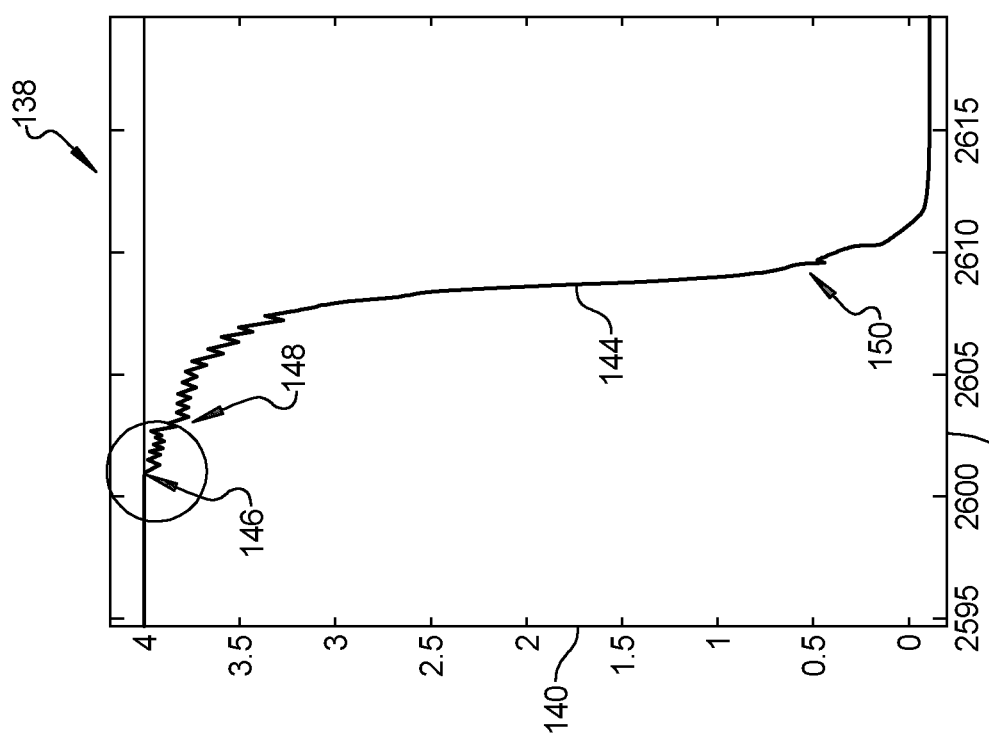
FIG. 9 is a graph comparing a cell voltage versus a time in seconds identifying a thermal runaway condition during a battery pack charging operation.

Referring to FIG. 9 and again to FIGS. 1 through 8, a graph 138 identifies a thermal runaway condition during a battery pack charging operation. Graph 138 compares a cell voltage 140 versus a time 142 in seconds. A cell voltage curve 144 indicates a short circuit 146 initiates at a time of 2600 seconds. The cell voltage 144 vibrates or modulates after the short circuit 146 occurs and a cell vent 148 starts approximately 0.2 seconds after the short circuit 146. The cell voltage 144 substantially drops after the voltage vibration ends and the battery cell is well into a combustion stage at a voltage point 150 occurring approximately at 2607 seconds.

Figure 10:
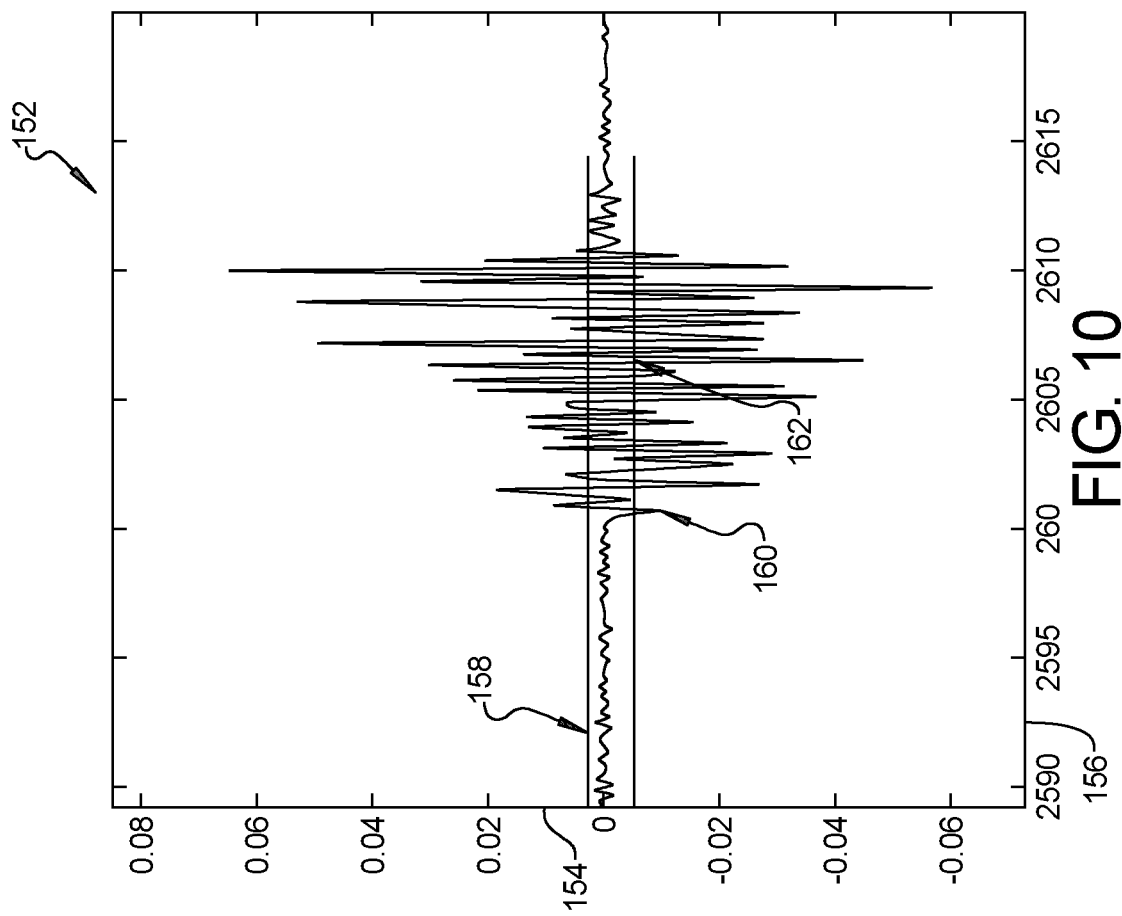
FIG. 10 is a graph identifying a voltage noise level over a time in seconds applying DWT identifying a TRA cell voltage level 1 decomposed signal during a charging operation.

Referring to FIG. 10 and again to FIGS. 1 through 9, a graph 152 presents use of DWT to identify a TRA cell voltage level 1 decomposed signal during the charging operation. Graph 152 identifies a voltage noise level 154 over a time 156 in seconds. A noise level threshold 158 identifies a boundary of a normal cell noise level. A cell short 160 is detected at approximately 2601 seconds, indicated by the noise level exceeding the threshold 158. A TRA 162 starts at approximately 2607 seconds.

A thermal runaway detection method and warning system 10 of the present disclosure may be applied as follows: an abrupt change detection method applied to a time series of cell voltage derivatives; a power spectrum estimation of voltage derivatives in a moving window using FFT; a power spectrum estimation of voltage derivatives in a moving window using RMS; detection of thermal runaway using an array of multiple diagnostic thresholds; an abrupt change detection applied to cell voltage derivatives; an energy estimation of a spectrum of Discrete Wavelet Transformation (DWT) of voltage derivatives.

A thermal runaway detection method and warning system 10 of the present disclosure offers several advantages. These include an early detecting method, which may detect possible failure modes in less than 1-2 seconds. Earlier detection may be used to prompt an immediate warning, and a thermal runaway mitigation system may be initiated.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for detecting thermal runaway of a cell, comprising:
    positioning a battery pack having multiple cells in an automobile vehicle;
    measuring, using a controller having at least one computer individually having at least one processor and at least one memory storing instructions, a cell voltage of the multiple cells at a predetermined sample rate;
    identifying, using the controller, if the cell voltage decreases and modulates indicating initiation of a cell short coincident with or preceding a cell surface temperature increase indicating initiation of a thermal runaway event;
    identifying if a power spectrum exceeds a predetermined threshold following initiation of the cell short;
    initiating, using the controller, an alarm after the predetermined threshold is exceeded;
    confirming the automobile vehicle to be stopped prior to measuring the cell voltage;
    identifying if a cell threshold temperature is reached defining approximately 70 C; and
    identifying if a cell temperature rise up to approximately 500 C occurs within approximately 5 seconds after the cell temperature reaches the threshold temperature during the battery cell thermal runaway event; and
    initiating, using the controller, action following the initiation of the alarm including at least one of:
        releasing, using the controller, a battery pack pressure;
        communicating, using the controller, a warning via a smart phone to a vehicle operator; and
        contacting, using the controller, an emergency service.

2. The method of claim 1, further including determining a mean value of all cell voltages of the multiple cells by subtracting a minimum cell voltage from a sum the cell voltages.

3. The method of claim 2, further including:
    calculating a derivative of the cell voltage of individual ones of the multiple cells with respect to time; and
    passing the derivative of the cell voltage through a buffer.

4. The method of claim 3, further including calculating a fast fourier transform power spectrum applying the derivative of the cell voltage of the multiple cells with respect to time.

5. The method of claim 4, further including calculating a released energy applying the power spectrum.

6. The method of claim 1, further including initiating an action following the initiation of the alarm including at least one of:
    stopping a charging operation of the battery pack;
    initiating flow of a coolant into the battery pack; and
    communicating a status of the battery pack to a remote cloud-based security service.

7. The method of claim 1, further including continuing to analyze the cell voltage and the cell surface temperature following the initiation of the cell short and during a time period having a cell voltage decrease and rapid cell voltage modulation and as the cell surface temperature increases.

8. A method for detecting thermal runaway of a cell, comprising:
    positioning a battery pack having multiple cells in an automobile vehicle;
    measuring, using a controller having at least one computer individually having at least one processor and at least one memory storing instructions, a cell voltage of the multiple cells at a predetermined sample rate;
    identifying, using the controller, if a cell short is occurring in at least one of the multiple cells;
    decomposing a signal of the cell voltage into multiple signal time domain scales through a scalable wavelet filter applying a discrete wavelet distribution (DWT);
    determining, using the controller, if a cell surface temperature increases to or above a threshold temperature indicating initiation of a cell thermal runaway event;

identifying if a power spectrum exceeds a predetermined threshold following initiation of the cell short;

initiating, using the controller, an alarm after the predetermined threshold is exceeded; and initiating, using the controller, an action following the initiation of the alarm including at least one of:

releasing, using the controller, a battery pack pressure;

communicating, using the controller, a warning via a smart phone to a vehicle operator; and contacting, using the controller, an emergency service.

9. The method of claim 8, further including:

passing a cell voltage signal through the wavelet filter; and applying a scaling function to differentiate and remove frequencies of the signal predesignated as noise.

10. The method of claim 9, further including applying the scaling function to split a first high frequency extraction portion into a first high frequency component and a first low frequency extraction portion into a first low frequency component.

11. The method of claim 10, further including:

halving the low frequency component from the first low frequency extraction portion; and generating level 1 coefficients.

12. The method of claim 11, further including:

calculating a derivative of the cell voltage of individual ones of the multiple cells with respect to time;

calculating a fast fourier transform power spectrum applying the derivative of the cell voltage of the multiple cells with respect to time;

calculating a released energy applying the power spectrum; and initiating an alarm if the power spectrum exceeds a predetermined spectrum threshold following initiation of the cell short.

13. The method of claim 8, further including identifying if the cell voltage decreases and modulates coincident with the cell surface temperature increase.

14. The method of claim 8, further including stopping a charging operation of the battery pack following the initiation of the alarm.

15. The method of claim 8, further including initiating flow of a coolant into the battery pack following the initiation of the alarm.

16. The method of claim 8, further including communicating a status of the battery pack to a remote cloud-based security service following the initiation of the alarm.

17. A system for detecting thermal runaway of a cell, comprising:

a controller having at least one computer, with the at least one computer individually having:

at least one processor; and at least one memory storing instructions, such that the at least one processor is programmed to:

confirm an automobile vehicle stop;

measure a cell voltage of multiple cells of a battery pack of the automobile vehicle at a predetermined sample rate;

identify a cell short by a cell voltage decrease and a start of cell voltage modulation;

identify if a power spectrum exceeds a predetermined threshold following initiation of the cell short;

indicate, a battery cell thermal runaway event in response to a cell threshold temperature being reached;

initiate an alarm after the threshold temperature is reached;

calculating a derivative of the cell voltage of individual ones of the multiple cells calculated with respect to time;

calculating a fast fourier transform power spectrum calculated applying the derivative of the cell voltage of the multiple cells with respect to time;

calculating a released energy calculated by applying the power spectrum; and initiating the alarm when the power spectrum exceeds a predetermined threshold following initiation of the cell short; and initiate an action following the initiation of the alarm including at least one of:

release a battery pack pressure;

communicate a warning via a smart phone to a vehicle operator; and contact an emergency service.

18. The system of claim 17, further including:

a cell voltage signal passed through a wavelet filter;

a scaling function applied to split a first high frequency extraction portion of the cell voltage signal into a first high frequency component and a first low frequency extraction portion into a first low frequency component; and frequencies of the cell voltage signal predesignated as noise being differentiated and removed.

19. The system of claim 17, wherein the controller is further programed to stop a charging operation of the battery pack following the initiation of the alarm.

20. The system of claim 17, wherein the controller is further programed to initiate a flow of a coolant into the battery pack following the initiation of the alarm.

* * * * *